Oct. 22, 1940.   H. T. BARKER   2,219,097
CLUTCH
Filed June 25, 1938   2 Sheets-Sheet 1

Inventor:
Henry Thomas Barker
By: Edward C. Fitzbaugh Atty.

Oct. 22, 1940.  H. T. BARKER  2,219,097
CLUTCH
Filed June 25, 1938   2 Sheets-Sheet 2
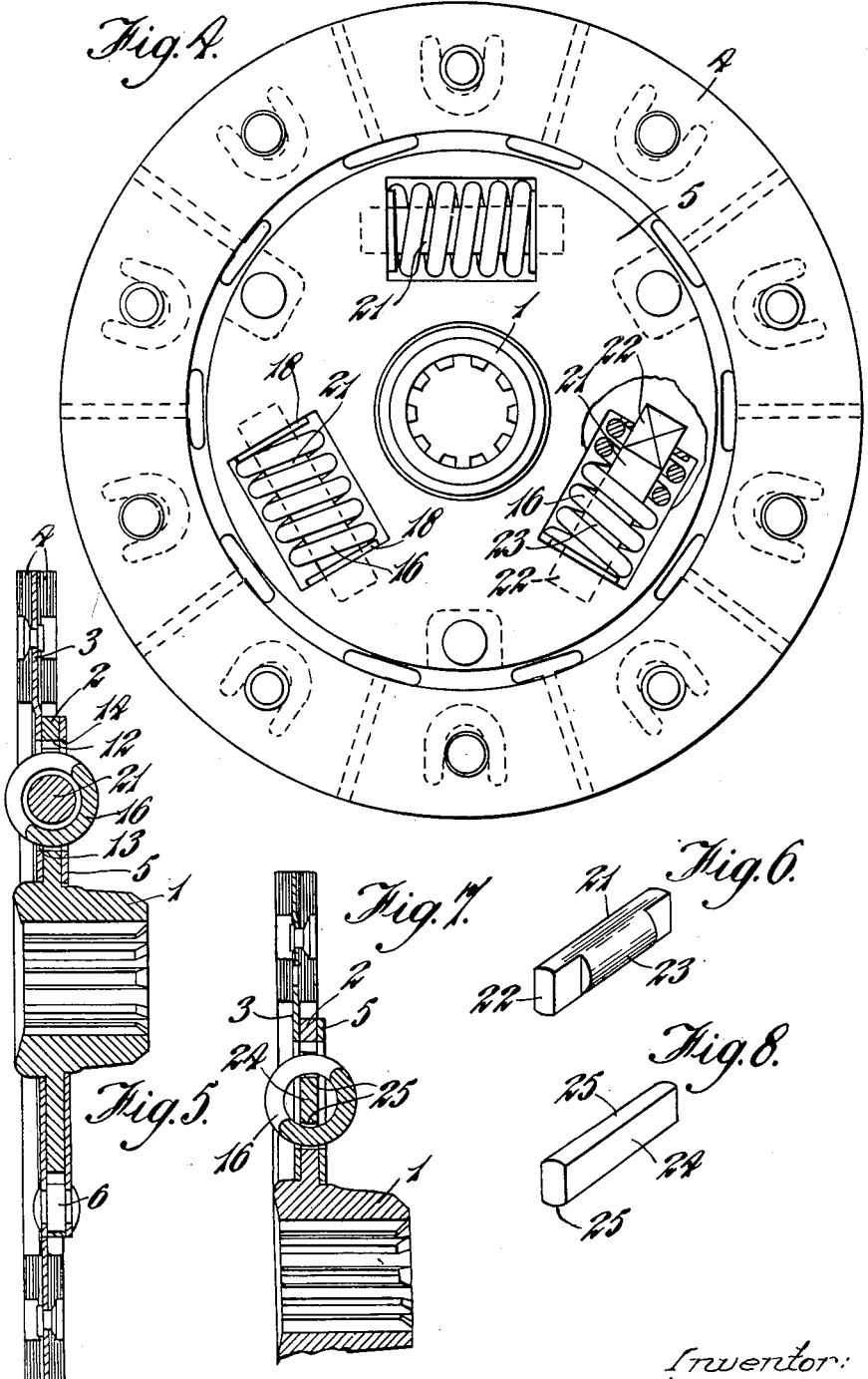

Patented Oct. 22, 1940

2,219,097

UNITED STATES PATENT OFFICE 2,219,097

CLUTCH

Henry Thomas Barker, London, England, assignor to Borg-Warner Corporation, Chicago, Ill., a corporation of Illinois Application June 25, 1938, Serial No. 215,757
In Great Britain July 1, 1937

8 Claims. (Cl. 192—68)

This invention relates to driven plates for clutches of the type in which the driven plate is gripped axially between two parts of a driving member to transmit motion to the shaft carrying the driven plate, and to that kind of driven plate which comprises a disc carrying facings of friction material and mounted for limited relative rotation on a flanged hub against the resistance of a circumferential series of coil springs mounted in registering openings in the disc and hub flange, and which absorb or prevent the transmission of shocks and vibrations.

The object of the invention is to provide improved locating or retaining means for the springs in a driven clutch plate of this kind.

According to the invention, a clutch plate of the kind referred to has the springs mounted each on a separate carrier member which projects beyond the ends of the spring, the carriers being wholly or in part within the thickness of the clutch plate, and being located at their projecting ends to retain the springs in position.

According to one feature of the invention, a clutch plate of the kind referred to and comprising a hub member having an annular flange, a disc supporting the friction facings arranged on one side of the flange, and a retaining plate secured either to the hub flange or the disc to enclose the third member between it and the member to which it is attached, has the circumferential series of springs arranged in slots cut through the three members, each spring being mounted on a carrier extending into notches in the ends of the slots in the central member, and being laterally retained therein by the other two members.

According to a further feature of the invention, a clutch plate of the kind referred to has the springs arranged in slots in the hub flange and the disc supporting the friction facings, and mounted each on a cylindrical carrier projecting beyond the ends of the spring into notches formed in the hub flange, the springs being retained against lateral movement in the notches by the disc in one direction, and a retaining plate in the other, the carriers being of such a diameter as to be an easy fit within the springs.

The invention will now be described with reference to the accompanying drawings, in which:

Figures 4 and 5 are views corresponding to Figures 1 and 2 of yet another form of clutch plate;

Figure 6 is a perspective view of the spring carrier, employed in the clutch plate shown in Figures 4 and 5;

Figure 7 is a partial section of a clutch plate similar to that shown in Figure 5, but using a modified form of spring carrier; and Figure 8 is a perspective view of the spring carrier shown in Figure 7.

Figures 1, 2, 3:
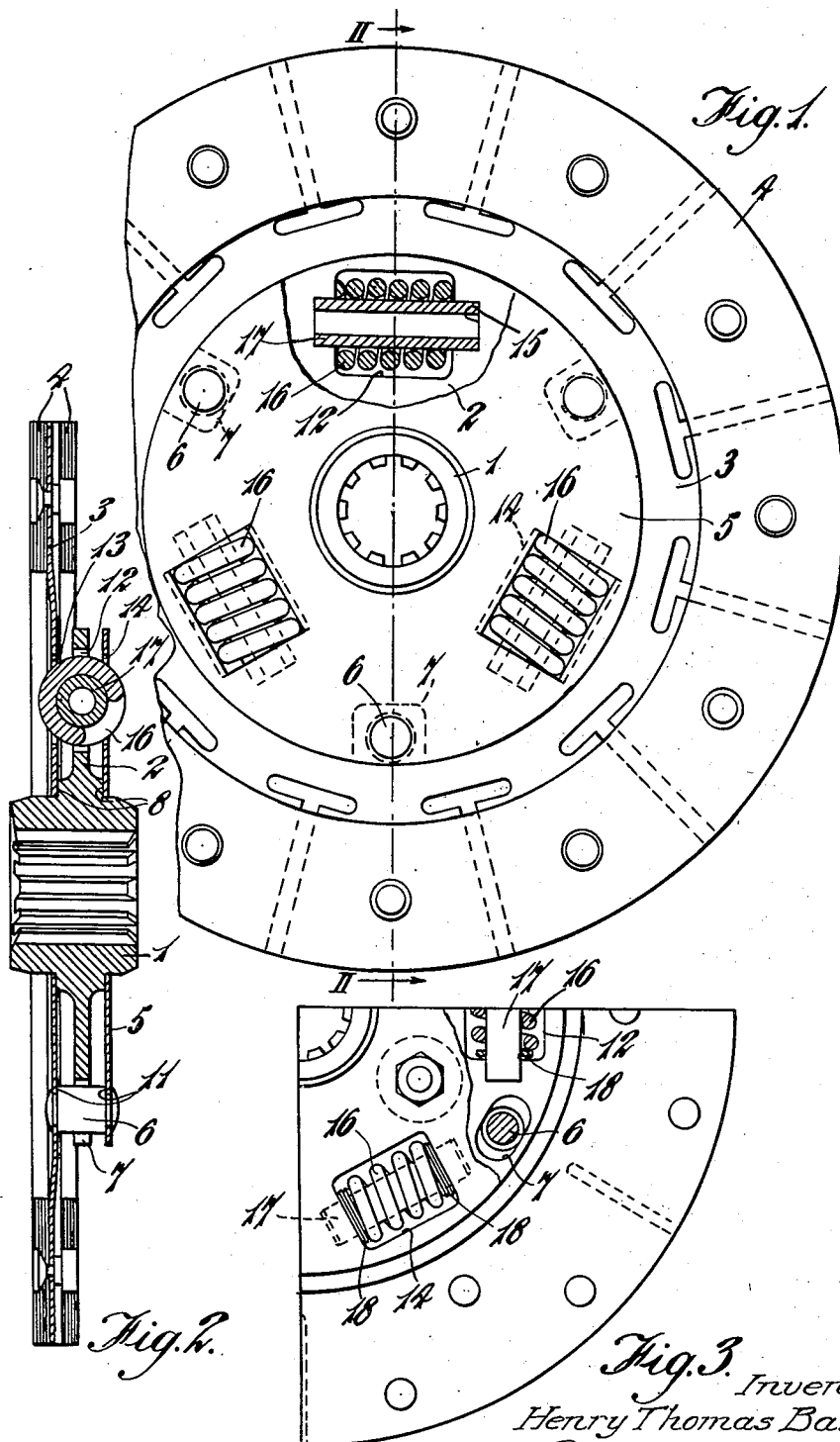
Figure 1 is an elevation of one form of clutch plate having spring carriers according to the invention.
Figure 2 is a cross-section on the line II—II of Figure 1.
Figure 3 is a partial elevation of another form of clutch plate in which the spring carriers are incorporated.

In the embodiment of the invention shown in Figures 1 and 2, the clutch plate comprises a hub 1 having an annular flange 2, a disc 3 carrying an annular friction facing 4 on each side and overlapping the hub flange 2, and a retainer plate 5 on the side of the hub flange 2 remote from the disc 3. The disc and retainer plate are secured together by a number of rivets 6 passing through notches 7 on the edge of the hub flange, the notches being circumferentially longer than the diameter of the rivets 6 so that the disc 3 can rotate to a certain extent relatively to the hub 1. The plate thus comprises a central member, in this case the hub flange 2, and two outer members, the disc 3 and retainer plate 5, secured to each other and free to perform a limited angular movement with reference to the central member. The disc 3 and retainer plate 5 are spaced some distance away from the hub flange 2, being located by shoulders 11 on the rivets by which they are secured together.

A circumferentially disposed series of slots 12 is cut in the hub flange 2, and corresponding slots 13 and 14 are cut in the disc and retainer plate, the slots in all three members being of substantially the same length. The slots 12 in the hub flange are extended lengthwise by rectangular notches 15 of less width than the main slots.

In each set of slots is arranged a coil spring 16 which bears on the ends of the slots, so that relative angular movement of the hub and disc in either direction causes compression of the spring between one end of the slot 12 in the hub flange and the other end of the corresponding slots 13 and 14 in the disc and retainer plate. Through the centre of each spring there extends a tubular carrier 17 whose diameter is such that the spring 16 is an easy fit over it. The tubular carrier 17 is longer than the slots 12, 13, 14, and extends at both ends into the notches 15 in the hub flange. The spacing of the disc and retainer plate is equal to or slightly greater than the diameter of the carrier, so that it lies between these two members, and is prevented by them from moving laterally out of the notches 15, whilst it is held against radial movement by the notches themselves.

The spring 16 is thus positively located against movement in all directions and is unable to become bowed outwardly during rotation of the clutch.

Figure 3 illustrates another form of clutch plate in which the spring carrier device is modified by the use of washers or annular discs 18 mounted on the carrier members 17 at the ends of the springs 16.

The springs 16 bear on the washers 18, and as those have a larger area in contact with the ends of the slots 12, 13, 14 than would the springs themselves, there is less liability that the pressure of the springs will deform the ends of the slots, as is otherwise liable to happen.

In Figures 4 and 5 is shown a clutch plate in which the disc 3 and retainer plate 5 are arranged in contact with the hub flange 2, so that the space between them is not normally sufficient to accommodate a rod or tube forming the spring carrier.

In these figures, the spring carrier is shown as a solid rod 21 the ends 22 of which are flattened to a thickness equal to that of the hub flange. The cylindrical portion 23 of the carrier is shorter than the slot 12, 13, 14 to permit relative angular movement of the hub 1 and the disc 2.

It will be seen that the edges of the slots 13, 14 in the clutch disc and retainer plate will, after a certain relative movement of the hub and disc, come into contact with the shoulders formed where the flattened portions 22 of the spring carriers merge into the cylindrical portions 23, and this type of spring carrier may thus be used as a limiting stop to control the degree of rotation, instead of the rivets 6.

Figure 6 shows the type of spring carrier used in the clutch plate in Figures 4 and 5.

The spring carrier in Figures 7 and 8 is in the form of a flat bar of metal 24 of substantially the same thickness as the hub flange 2, and having slightly curved edges 25 to engage the interior of the spring. The bar 24 is of sufficient thickness to provide surfaces 25 which engage the spring over an arc of some length, and thus prevent lateral as well as radial movement at the springs. The bar therefore fits in the notches 15 and is held in place by the disc 3 and retainer plate 5. Washers 18 as shown in Figure 1, may be used with this form of spring carrier.

In addition to the several forms described in the specification, the spring carriers may be of elliptical section, square, polygonal, or of generally cylindrical form with one, two or more flats, the essential feature of the carrier being that it shall allow no substantial movement of the spring in any direction, other than the compression and extension of the spring which takes place due to relative angular movement of the hub and disc.

I claim:

1. A clutch plate of the character described comprising a hub member having an annular flange element, a disc element overlapping said flange and having friction facings mounted on its outer peripheral portion, a retainer plate secured to one of said annular hub flange and disc elements to enclose the remaining of said flange and disc elements between it and the element to which it is attached, the overlapping portions of said flange element, disc element and retainer plate being provided with registering openings therethrough in annular array, compression springs disposed in said openings and engaging the opposed ends of said openings, and spring retainer means comprising structurally independent members extending through said springs, located on the axis thereof and confined at their opposite ends between the outermost of said three overlapping elements whereby said members, though free of rigid attachment to the associated parts, are restrained positively against displacement.

2. A clutch plate as defined in claim 1, wherein the retainer means are in the form of tubular cylindrical rods of a diameter substantially equal to the spacing between the outer of said three overlapping elements.

3. A clutch plate as defined in claim 1, wherein the retainers are in the form of solid cylindrical rods of a diameter greater than the spacing of the outermost of said three overlapping elements and wherein the ends of said rods are flattened to a thickness equal to the spacing between the said outer of said three overlapping elements.

4. A clutch plate as defined in claim 1, wherein said retaining elements are in the form of flat bars substantially equal in thickness to the spacing between said disc and said retainer plate.

5. A clutch plate as defined in claim 1, wherein the radially spaced edges of the retainer elements are curved to conform substantially to the interior curvature of the spring.

6. A clutch plate as defined in claim 1, wherein the retaining members have annular discs or washers encompassing the same disposed between the ends of the springs and the adjacent edges of said registering openings.

7. A clutch driven plate comprising a hub having an annular radial flange, a pair of annular members, one comprising a facing supporting disc, embracing said flange, axially spaced thereby and secured together, said flange and members having registering openings, coil springs seated in said openings and arranged to yieldingly transmit torque loads between said flange and said members, and a plurality of structurally independent spring mounting elements each extending through a respective spring, disposed in the plane of the flange and having their ends confined between said members.

8. A clutch plate comprising a hub having an annular radial flange, a pair of annular members, one comprising a facing supporting disc, embracing said flange, axially spaced thereby, and secured together, said flange and members having registering openings, coil springs seated in said openings and arranged to yieldingly transmit torque loads between said flange and said members, and a plurality of structurally independent spring mounting elements, each extending through a respective coil spring, disposed in the plane of the flange and having their ends confined between said members against axial movement, said hub flange being formed with notches in which the ends of said mounting elements are confined against radial movement.

H. T. BARKER.